Fig. 3.

Oct. 29, 1929.  F. W. SPERR, JR  1,733,321
GAS PURIFICATION PROCESS AND APPARATUS
Filed Nov. 18, 1925  6 Sheets-Sheet 6

Fig. 6.

INVENTOR
Frederick W. Sperr Jr
BY
Munday, Clarke & Carpenter
his ATTORNEYS

Patented Oct. 29, 1929

1,733,321

UNITED STATES PATENT OFFICE

FREDERICK W. SPERR, JR., OF PITTSBURGH, PENNSYLVANIA, ASSIGNOR TO THE KOPPERS COMPANY, OF PITTSBURGH, PENNSYLVANIA, A CORPORATION OF PENNSYLVANIA

GAS PURIFICATION PROCESS AND APPARATUS

Application filed November 18, 1925. Serial No. 69,929.

This invention relates to process and apparatus for the elimination of hydrogen sulphide and other impurities from fuel gases and more particularly relates to such purification of gas by a process and apparatus which includes the use of ammonia in combination with a ferric compound and in which the metal sulphide is regenerated by aeration in a substantially ammonia-free suspension.

In the removal of hydrogen sulphide from gases such as coal gas, water gas, oil gas and the like, great success has been obtained by treating such gases with an alkaline solution containing a ferric compound in solution or suspension. The spent solution containing ferric sulphide in suspension is treated with finely atomized air which effects a regeneration of the active ferric compound and a simultaneous separation of the sulphur in the form of a foam which can be readily removed from the system. Reference may be made to copending application of F. W. Sperr, Jr., and D. L. Jacobson, Serial No. 730,676 and the copending applications of F. W. Sperr, Jr., Serial Nos. 21,982 and 21,983.

The alkaline liquid employed is usually a solution of sodium carbonate but other soluble alkalies or alkali carbonates may be employed. The systems described in the above noted applications are not, however, adapted to the use of ammonia as the alkali because of the volatile nature of this substance, which would cause intolerable losses in both the gas absorption and the aeration stages.

In the present invention, the employment of ammonia or of any compound of ammonia having an alkaline reaction is made possible and this has several advantages over sodium carbonate or other alkalies. In the first place, it is readily available in coal gas plants, being produced as by a by-product in the manufacturing process so that in the present invention it is unnecessary to purchase any alkali other than what is thus produced at the plant. In the second place, the ammonia may readily be recovered from any secondary compounds, such as ammonium thiosulphate or ammonium thiocyanate, that may be incidentally formed in the operation of the purification process, while the corresponding secondary compounds formed when sodium carbonate or other alkalies are employed, represent a direct loss because they can not be so readily reconverted into alkali. In the third place, the employment of ammonia in the present invention makes possible the oxidation and regeneration of the ferric sulphide in a substantially neutral medium. The advantages of this have been pointed out in the copending application Serial No. 21,982 referred to above, where it is shown that a neutral condition is more favorable for the oxidation of the metal sulphide and for the separation of free sulphur.

The invention further consists in such other new and useful improvements, and has for further objects such other operative advantages or results, as may be found to obtain in the processes and apparatus hereinafter described or claimed.

In the accompanying drawings forming a part of this specification and showing for purposes of exemplification certain form and manner in which the invention may be embodied and practiced but without limiting the claimed invention to such illustrative instance.

Fig. 3 is an elevational view similar to Fig. 1 of apparatus for treating ammonia bearing gas employing a direct process for the recovery of ammonium sulphate together with the process for liquid purification of gas in accordance with the present invention.

Figure 1:
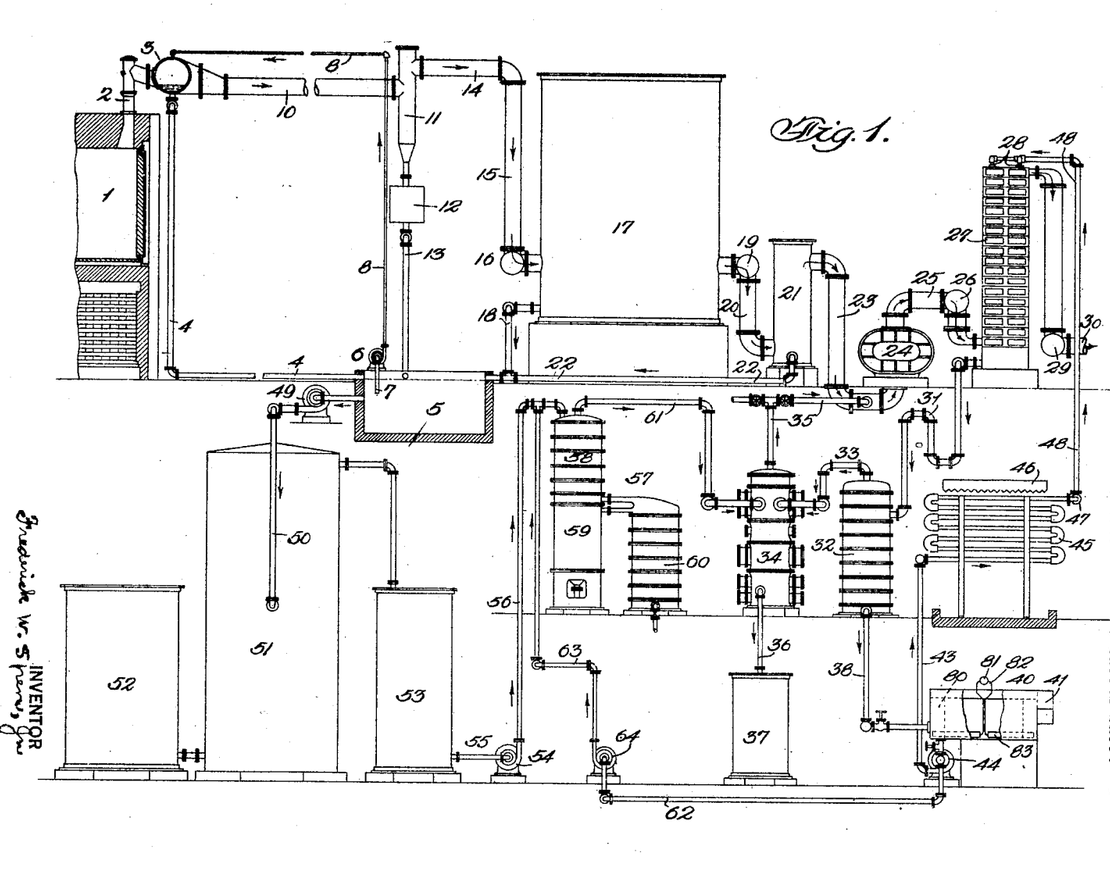
Figure 1 is an elevational view of apparatus for treating ammonia bearing gas employing an indirect ammonia recovery process together with the process for liquid purification of gas in accordance with the present invention.
Figure 2:
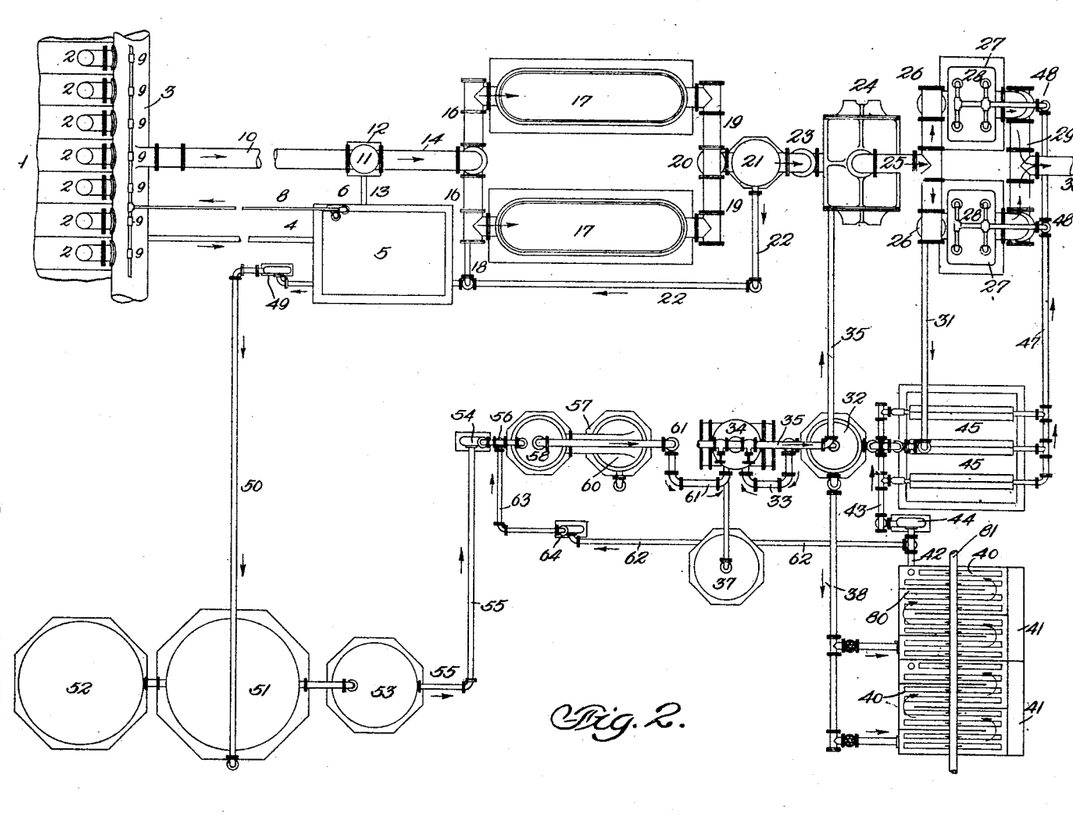
Figure 2 is a plan view of the apparatus shown in Fig. 1.

Referring to Figs. 1 and 2, which illustrate apparatus used in the application of the invention to systems employing an indirect ammonia recovery process together with apparatus for a system of liquid purification of gas, 1 represents a battery of coke ovens. During the coking process, the gases pass through stand-pipes 2 into collecting main 3; here part of the tar drops out of the gas and some moisture is also condensed, carrying with it part of the ammonia. The tar ammoniacal liquor flow through pipe 4 to the "hot drain tank" 5 which also accumulates tar and ammoniacal liquor from other parts of the system, as will be shown.

In order to prevent the collecting main from becoming too hot, it is customary to recirculate over this main a mixture of tar and ammoniacal liquor from the hot drain tank 5. This liquor is pumped by pump 6 through pipes 7 and 8 to sprays 9 in the top of the collecting main.

From the collecting main the partly cooled gases pass through suction main 10 where some further condensation of tar and ammoniacal liquor occurs, this liquor flowing down through the vertical main 11 to "pitch trap" 12 and thence through pipes 13 to the hot drain tank 5, the gases passing from the main 11 through mains 14 and 15 to the manifold pipe 16, from which they go through either one or both of the primary coolers 17. In these primary coolers the gases pass around tubes through which cold water flows and are reduced to a temperature of preferably 15° to 20° C. Additional tar and substantially all of the remaining condensible ammoniacal liquor are removed from the gases in the primary coolers and pass out through pipes 18 to the hot drain tank 5.

From the primary cooler 17, the gases pass through manifold 19 and pipe 20 to the tar extractor 21 where the removal of the tar is completed, the tar then flowing through pipes 22 to the hot drain tank 5.

From the tar extractor 21, the gases flow through pipes 23 and through exhauster 24 to pipes 25 and manifold 26 into either one or both of the ammonia scrubbers 27.

These ammonia scrubbers may be of the bell type, well known in the art, or they may be mechanical scrubbers or any other type of scrubber suitable for the purpose.

In the usual operation of the indirect ammonia recovery process, the gas is treated in the ammonia scrubber with wash water which removes all of the remaining ammonia as ammoniacal liquor. The present invention differs from the ordinary process in that instead of plain water a solution or suspension of a ferric compound is employed. Such a solution or suspension is employed to wash all of the ammonia out of the gas and takes up the ammonia in solution which when thus added to the wash liquor renders the solution or suspension alkaline and the alkalinity of the wash liquor helps the ferric compound to remove the hydrogen sulphide from the gas with formation of insoluble compounds such as ferric sulphide. Instead of the ferric compound any other metal compound may be used which is capable of reacting with hydrogen sulphide to form a metal sulphide which can be readily oxidized by aeration. Thus for example, compounds of manganese, cobalt or nickel may be substituted for the ferric compound.

It is preferable that the metal compound employed shall not react with ammonia to produce fixed ammonium salts. Thus it is better to have the bulk of the metal compound in the form of oxide, hydroxide, carbonate or sulphide than in the form of chloride or sulphate. In the specific application of my invention, I employ a suspension of hydrated ferric oxide in water. This suspension may be prepared with bog ore pulverized so that substantially all passes through a 200 mesh sieve, as described in application Serial No. 21,983 referred to above.

Excellent results are obtained by using a freshly precipitated ferric compound as described in Serial No. 730,676 referred to above, and this compound may, for example, be prepared by using a solution of ferric chloride or ferric sulphate which will react with the ammonia precipitating ferric sulphide, ferric hydroxide, basic ferric carbonate, etc., depending upon the composition of the gas treated. This use of ferric chloride or ferric sulphate involves no contradiction to the above statement that it is preferred to use metal compounds which do not form fixed ammonium salts. The reason for this is that the amount of ferric chloride or ferric sulphate necessary to be added is merely what is required to compensate for mechanical losses and is generally insignificant in proportion to the amount of ammonia in the gas. The ferric chloride is usually added at the regeneration stage and helps in reducing the alkalinity of the solution in the aeration stage where the iron sulphide is converted to iron oxide. Also such ferric chloride that is added is converted to ferric sulphide in the absorption stage and when regenerated it is converted to ferric oxide so that very little ferric chloride needs to be added because, while the chlorine of the compound is lost to the purification system by its combination with the ammonia, the iron is not lost but remains in the purification system either as ferric sulphide or after aeration as ferric oxide, and therefore only small amounts of ammonium chloride and ammonium sulphate are formed. These accumulate in the system and the ammonia is recovered from them by withdrawing a portion of the circulating liquid from time to time and distilling it as will be later described. The process proper depends upon the removal of hydrogen sulphide by the metal compound and not upon any action between the metal compound and ammonia.

The amount of ferric compound in suspension is usually maintained higher than in the processes which employ sodium carbonate as the alkali, because in the scrubbing of ammonia it is desirable to employ a smaller rate of circulation, but in most cases the amount of ferric compound in suspension need not exceed 1.5%–2% $Fe_2O_3$.

The suspension of the ferric compound is introduced to the scrubbers 27 through sprays 28 and the hydrogen sulphide is removed either through direct reaction between the ferric compound and the hydrogen sulphide or through the formation and decomposition of ammonium sulphide as follows:

Some hydrocyanic acid and carbon dioxide are also removed in the form of ammonium cyanide, ammonium sulphocyanide and ammonium carbonate.

The purified gas passes out of the scrubbers into manifold 29 and through pipe 30 to the point of consumption.

The liquid containing ammonia in solution and ferric sulphide in suspension (this liquid will also usually contain an excess of unaltered ferric compound, e. g., ferric hydroxide, or hydrated ferric oxide) passes out of the scrubbers through pipes 31 to the still column 32. This still column may be of any standard efficient type known in the art of ammonia distillation and having the usual bubbling sections adapted for steam distillation of ammonia liquor. The liquid inlet pipe 31 is shown passing into the third section from the top of the column, the two upper sections being for the purpose of preventing loss and contamination through entrainment.

The operation of the still column 32 is conducted the same as in the ordinary process of ammonia distillation. Steam is admitted to the lowest section and passes upward, expelling ammonia which passes out with the steam through the vapor line 33 to the condenser 34. Any uncondensed gases flow out of the condenser 34 through pipes 35 to the gas main 23 on the inlet side of the exhauster 24. The condensed ammonia liquor flows out of the condenser through pipe 36 to tank 37. The operation of the still column 32 should be conducted with such efficiency that substantially all of the ammonia is expelled from the liquid, and the hot suspension of ferric sulphide with unaltered ferric oxide, etc., flowing out of the bottom of the still through pipe 38 should be nearly neutral in reaction. This suspension flows into the thionizer 40, the construction and operation of which is substantially as described in the copending application of G. E. Seil, Serial No. 21,978, filed April 9, 1925. I have, however, found it advantageous to employ a plurality of baffles 80 in the thionizer tank so as to give the solution a long path of travel, as shown by the arrows. The tank is divided in two or more compartments and the piping arrangements are such that any one compartment might be shut off, drained and cleaned without interference with the others. Air from line 81 flows through pipe 82 into and through tubular fabric aerators 83, the tubular fabric 83 diffusing the air into the body of liquid as a large volume of finely atomized air.

In the thionizer the ferric sulphide is agitated and oxidized by the finely atomized air in accordance with the reaction Under the action of the air bubbles the liberated sulphur floats to the surface, as a foam which passes over into the trough 41 from which it may be transferred to a centrifuge or filter for the recovery of the sulphur. The solution from the centrifuge or filter is returned to the system. Flotation oils or reagents, for example, kerosene, may be added to the liquid in the thionizer to assist in the separation of the sulphur. It should be noted that the solution passing into the thionizer is hot. The high temperature greatly facilitates the oxidation of the ferric sulphide.

The hot regenerated suspension of ferric oxide passes out of the thionizer through pipe 42 to pump 44 and thence through line 43 and cooling coils 45. Cold water from trough 46 is showered over these coils and reduces the temperature of the suspension-liquid preferably to less than 20° C. so that it will be effective in the ammonia scrubbing process. The regenerated suspension-liquid then passes through pipes 47 and 48 back to the sprays 28 of the ammonia scrubber 27.

Losses of water that occur through evaporation in the thionizer and distillation in the still column and any mechanical losses are compensated by adding fresh water to the contents of the thionizer.

It remains to describe the disposal of the tar and ammoniacal liquor collected in the hot drain tank 5. This material is transferred by pump 49 through pipes 50 to separating tank 51, the tar passes into tank 52 and the ammoniacal liquor collects in tank 53.

The ammoniacal liquor thus collected contains practically all of the fixed ammonia compounds, ammonium chloride, ammonium sulphide, etc. together with some free ammonia. It is transferred by pump 54 through pipes 55 and 56 to ammonia still 57. This still is of the usual design, well known in the art, comprising a free still column 58 and lime section 59 and a fixed still column 60. The distillation is effected with steam. The free ammonia is expelled in the column 58 and the fixed ammonia compounds decomposed with lime in the lime section 59 pass to the fixed column 60 in which the ammonia is expelled. The ammonia in steam passes through pipes 61 to condenser 34, and is condensed along with the ammoniacal vapors from the still 32, as above described.

In the process described above, the removal of hydrogen sulphide from the gas is effected through the agency of the free ammonia remaining in the gas after the fixed ammonia compounds have been separated by condensation. Some traces of fixed ammonia compounds may, however, pass along with the gas into the ammonia scrubber 27 and later accumulate in the circulating liquid. Moreover, secondary reactions will occur in the purification systems involving the formation of ammonium thiosulphate and ammonium thiocyanate, both of which are fixed ammonia compounds and are not decomposed in the still column 32. I, therefor, provide pipes 62 and 63 and pump 64 whereby portions of the liquid may be withdrawn from the thionizer outlet from time to time and transferred to the ammonia still 57 for recovery of fixed ammonia content. This liquid may, if desired, be transferred directly to the lime section 59 instead of to the top of the free section 58. This liquid may also, if desired, be filtered prior to distillation for the purpose of separating the suspended ferric compound, although this compound does not in any way interfere with the ammonia distillation process.

Figure 4:
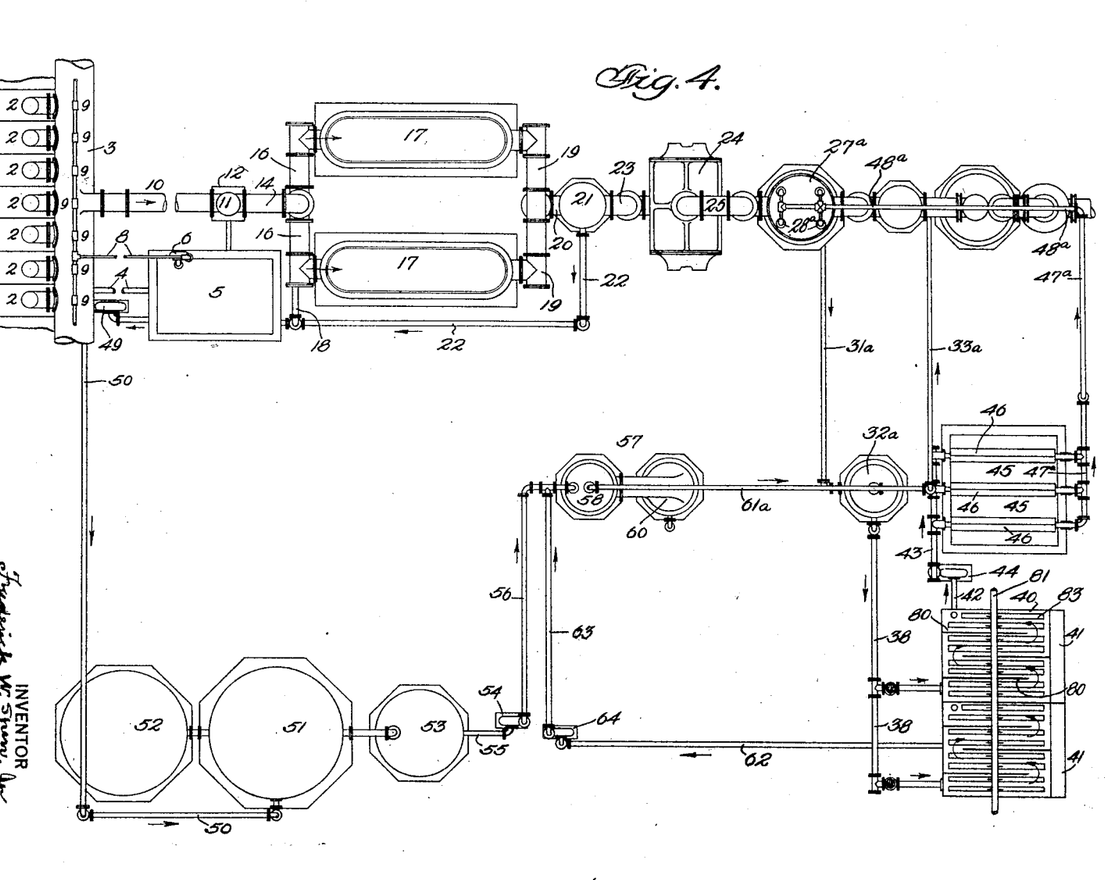
Fig. 4 is a plan view of the apparatus shown in Fig. 3.

Referring to Figs. 3 and 4, which illustrate apparatus used in the application of the invention to a system for treating fuel gas employing a direct process for the recovery of ammonium sulphate together with apparatus for liquid purification of gas, the same characters of reference are used to denote the same parts described in connection with Figs. 1 and 2, but apparatus which have been altered in form or position to conform with the difference in the process of recovery of ammonia, is designated by reference numerals followed by a small letter "a" (i. e. absorber 27ª, line 38ª, etc.) while added apparatus is given new reference numerals.

In the previous description, the application of the present invention was described in relation to a system of by-product recovery based upon the so-called "indirect" system of ammonia recovery. The following description relates to the application of the invention to a system employing the "direct" process of ammonia recovery, wherein the ammonia is recovered in the form of ammonium sulphate. It should be noted that the terms "direct" and "indirect" were originated to designate these processes with relation to the formation of ammonium sulphate, the meaning being that the ammonia recovered as vapor, and afterward converted to sulphate, in the indirect system is recovered directly as sulphate by replacing the condenser 34 (shown in Figs. 1 and 2) with a saturator of the acid bath type. The so-called indirect plants often do not attempt the recovery of ammonia as sulphate, but produce crude or aqua ammonia.

In the "direct" system (such as is most commonly used in this country today and as outlined in principle in United States patent to H. Koppers, Re. No. 12,971, reissued June 8, 1909) the gas, after being cooled and freed from tarry matter, is somewhat reheated and then passed through a bath of sulphuric acid in a suitable apparatus called the saturator, the ammonia in the gas reacts directly with the acid to form ammonium sulphate, which is deposited in the saturator and then the ammonia-free gas is again cooled after it leaves the saturator, and is then ready for purification from hydrogen sulphide and hydrocyanic acid, to whatever extent is desired. Following the drawings, Figs. 3 and 4, which are elevation and plan respectively, we find that the treatment of the gas, up to the point when, substantially free of tar and fixed ammonia compounds, it traverses the exhauster 24, is precisely as shown in the two previous figures. In the present instance, the gas leaving the exhauster passes through the line 25 into the cylindrical absorber tower 27ª, that is constituted substantially as shown in the copending application, Serial No. 730,676 referred to above. Here the gas containing ammonia comes into intimate contact with nearly neutral suspension of a ferric compound, which absorbs during its passage through the tower 27ª substantially all of the hydrogen sulphide, and a portion only of the free ammonia in the gas, the resultant alkalinity being such as to facilitate the removal of the hydrogen sulphide. In practice, the amount of ammonia absorbed in the tower 27ª is regulated by the temperature of either the gas or wash liquor. The cooling of the regenerated wash liquor in the coils 45 is regulated so as to leave the desired amount of heat in the solution dependent upon the amount of ammonia that it is desired should be washed out in the tower 27ª or the wash liquor may be heated before it reaches the tower 27ª. The higher the temperature, the less ammonia will be absorbed; while on the other hand a high temperature to some extent favors the absorption of hydrogen sulphide. Only so much ammonia should be removed in the tower 27ª as may be necessary to make the wash liquor distinctly alkaline to properly absorb the hydrogen sulphide, because the washing in the tower 27ª is primarily for the removal of hydrogen sulphide and the removal of the ammonia is merely an advantageous incident. The gas purified of hydrogen sulphide passes out of the tower through the downcomer 65 into the reheater 66, wherein it is reheated to from 50° to 60° C., and passes through pipe 67 into the saturator 68. Here the remaining ammonia reacts with the sulphuric acid contained by the saturator to form ammonium sulphate, and the ammonia-free gas flows through the pipe 69 into acid separator 70, which collects and returns to the saturator any particles of acid which may have been entrained by the gas. The gas flows from the separator through the pipe 71, and is conducted away to be cooled in suitable apparatus (this being generally the usual final cooler).

The now alkaline ammoniacal suspension of iron compounds, containing sulphur in various forms as above described, leaves the tower 27ª through the sealed exit line 31ª, and enters the still 32ª, where it is divested of most of its alkaline ammonia content by the direct action of steam, and flows out, hot and as nearly neutral as possible through line 38 into the thionizer 40. The sulphur is hereby recovered in elemental form under the oxidizing influence of aeration, as above described, and the revivified suspension is pumped by means of pump 44 through line 43, cooling coils 45, lines 47ª and 48ª and sprays 28ª into the absorber 27ª, thus completing the cycle. The amount of cooling of the wash liquor in the cooling coils 45 depends on the quantity of ammonia that is to be removed in the tower 27ª.

The steam and ammonia vapors leaving the still 32ª pass through vapor line 33ª into the saturator 68, where the ammonia is recovered as sulphate. To these vapors are added the vapors from the still 57, wherein are distilled the ammoniacal liquors separated by the condensation prior to the passage of the gas through the exhauster 24; the latter vapors leave the still 57 through the vapor line 61ª which joins the line 33ª. Thus all the ammonia is eventually sent into the saturator 68, and there recovered. The ammonia in such fixed compounds as the thiocyanate and thiosulphate, which may be formed in the purification system, may be recovered. Portions of the liquid from the thionizer outlet are pumped into the still 57 by the pump 64, and the ammonia content of the same is thus recovered. If it is necessary to filter the liquid withdrawn from the thionizer for this purpose, to remove any insoluble material, this may be done without in any way detracting from the invention.

Figure 5:
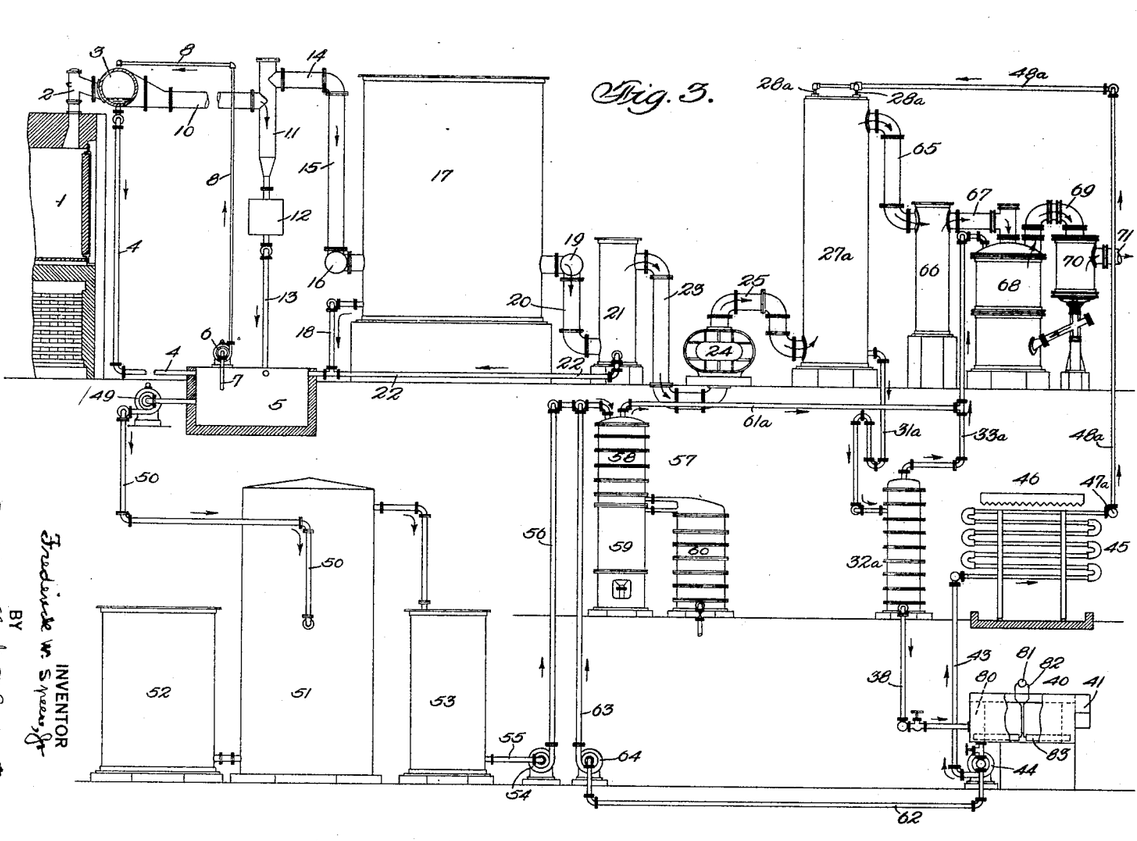
Fig. 5 is an elevational view of apparatus for treating gas which does not contain ammonia, said apparatus employing the process for liquid purification of gas in accordance with the present invention.
Figure 6:
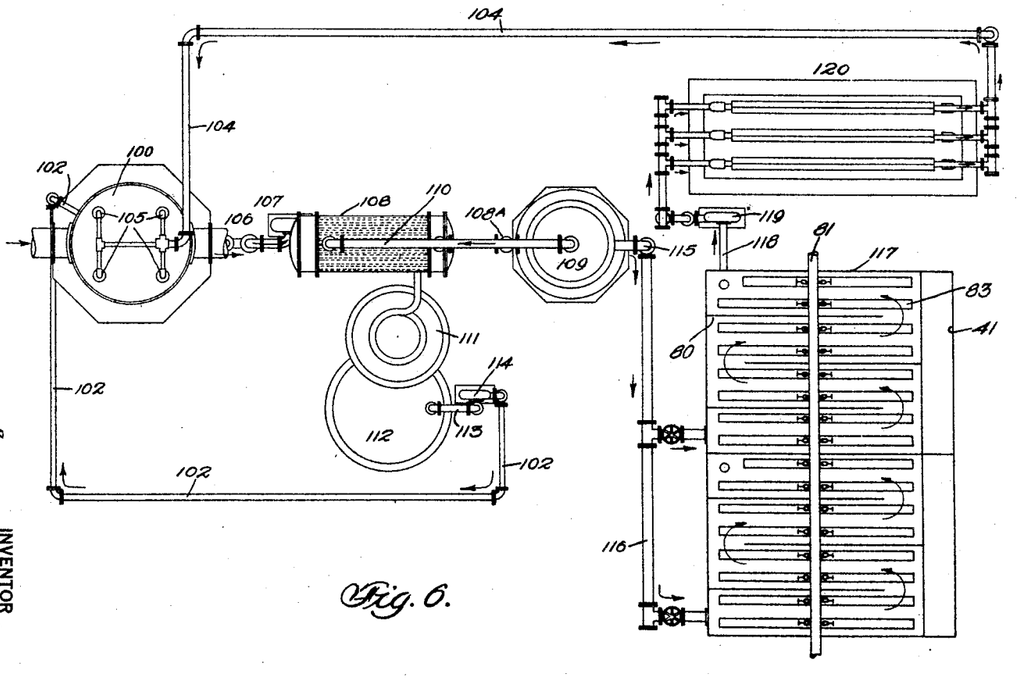
Fig. 6 is a plan view of the apparatus shown in Fig. 5.

Referring to Figs. 5 and 6, which illustrate apparatus used in the application of the invention to a system for treating gases that do not contain ammonia, the gas containing hydrogen sulphide but no ammonia passes into the absorber 100 which is preferably of the type described in copending application of F. W. Sperr, Jr., Serial No. 21,980, filed April 9, 1925. This absorber in the present instance is divided into two sections, the lower section having the function of removing the hydrogen sulphide, while the upper section removes any ammonia that may be picked up from the solution by the gas. Ammoniacal liquor in the tank 112 is pumped through piping 102 and sprays 103 and is distributed over the packing in the lower section of the absorber. A suspension of ferric oxide or other ferric compound in water passes through pipe 104 and sprays 105 and is distributed over the packing in the upper section of the tower. This liquid passing down through the upper section, washes out any ammonia that may pass upward with the gas from the lower section and then mingles with the ammoniacal liquor from sprays 103 and passes down over the lower section in which the hydrogen sulphide is removed by the resulting ammoniacal solution and ferric compound.

The liquid, containing ammonia in solution and ferric sulphide in suspension (this liquid will also usually contain an excess of unaltered ferric compound, e. g., ferric hydroxide or hydrated ferric oxide) passes out through pipe 106 and is pumped by pump 107 to heat exchanger 108, in which it is preheated by the vapors coming from the still column 109 through the line 110. From heat exchanger 108 the liquid is fed through pipe 108A into the still column 109. The upper sections of this still column act as a separator and dephlegmator so that a high concentration of ammonia is obtained in the vapors passing through pipe 110 through heat exchanger 108 to condenser 111. The condensed ammonia liquor is accumulated in tank 112 and is pumped from this tank through pipe 113 and pump 114 and pipes 102 back to the lower section of the absorber. The effluent liquor from the still column 109 consists of a nearly neutral suspension of ferric sulphide with unaltered ferric oxide, etc. in water and passes through pipes 115 and manifold 116 into the thionizer 117, the construction and operation of which has been described. The regenerated suspension from which the sulphur has been separated passes into manifold 118 and is pumped by pump 119 through cooling coils 120 and pipes 104 back to the upper section of the absorber.

Ordinarily, sufficient ammonia is maintained in the system so that the liquid passing down through the lower section of the absorber shall contain 5 to 10 grams $NH_3$ per liter and additional ammonia is added from time to time to compensate for any losses that might occur mechanically or through secondary reactions. Portions of the liquid may be withdrawn from the thionizer from time to time and distilled for the recovery of any ammonia that may be present in the form of fixed ammonia compounds produced by secondary reactions.

Although in the foregoing description the ammonia is removed by distillation from the solution or a suspension prior to the aeration stage, it is obvious that an important feature so far as concerns the economic operation of the process is the removal of the free ammonia from the solution, i. e., treating the solution so that it is substantially free of ammonia alkalinity (free ammonia), prior to aeration irrespective of the means by which such removal or freeing of ammonia alkalinity (free ammonia) is accomplished. For example, the free ammonia may be neutralized by adding an acid to the solution or suspension prior to the aeration stage. Free ammonia might also be removed by blowing a heated gas through the solution or suspension prior to the aeration stage.

In any of the foregoing applications of my invention I may employ other soluble substances in conjunction with the circulating liquid. I may, for example, add thereto a small amount of sodium carbonate or other alkaline material to assist and supplement the action of the ammonia. I may also add various inert or partially inert substances in solution or suspension, and such additions may be made without detracting in any way from the spirit of the invention.

The invention as hereinabove set forth is embodied in particular forms but may be variously embodied within the scope of the claims hereinafter made.

I claim:

1. A process for removing hydrogen sulphide from gas which consists in: washing the gas with an ammoniacal solution containing a compound of metal which forms an insoluble sulphide capable of oxidation in aqueous suspension; removing substantially all of the free ammonia from the liquid containing the resulting metal sulphide in suspension; then treating the liquid containing said metal in suspension with an oxidizing agent; taking ammonia into the liquid after oxidation; and treating the gas with the reconstituted ammoniacal liquid in the gas washing stage.

2. A process for removing hydrogen sulphide from gas which consists in: washing the gas with an ammoniacal solution containing a compound of metal which forms an insoluble sulphide capable of oxidation in aqueous suspension; removing substantially all of the ammonia alkalinity from the liquid containing the resulting metal sulphide in suspension; then treating the liquid containing said metal in suspension with an oxidizing agent; removing sulphur from the liquid after treatment with the oxidizing agent; taking ammonia into the liquid after oxidation; and treating the gas with the reconstituted ammoniacal liquid in the gas washing stage.

3. A process for removing hydrogen sulphide from gas which consists in: washing the gas with an ammoniacal solution containing a ferric compound in aqueous suspension; removing substantially all of the ammonia from the resulting solution containing ferric sulphide in suspension; then treating the liquid containing the ferric sulphide in suspension with an oxidizing agent; taking ammonia into the liquid after oxidation; and treating the gas with the reconstituted ammoniacal liquid in the gas washing stage.

4. A process as claimed in claim 3 in which the ferric compound is hydrated ferric oxide.

5. A process for removing hydrogen sulphide from gas which consists in: washing the gas with an ammoniacal solution containing a ferric compound in aqueous suspension; removing substantially all of the ammonia alkalinity from the resulting solution containing ferric sulphide in suspension; then agitating the liquid while containing the ferric sulphide in suspension with an oxidizing agent; taking ammonia into the liquid after oxidation; and treating the gas with the reconstituted ammoniacal liquid in the gas washing stage.

6. A process for removing hydrogen sulphide from gas which comprises: washing the gas with an ammoniacal solution containing a ferric compound in aqueous suspension; removing substantially all of the ammonia from the resulting solution containing ferric sulphide in suspension; then treating the suspension with finely atomized air for oxidation; taking ammonia into the liquid after oxidation; and treating the gas with the reconstituted ammoniacal liquid in the gas washing stage.

7. A process for removing hydrogen sulphide from gas which comprises: washing the gas with an ammoniacal solution containing a ferric compound in aqueous suspension; removing substantially all of the ammonia alkalinity from the resulting solution containing ferric sulphide in suspension; then agitating the suspension with finely atomized air for oxidation; taking ammonia into the liquid after oxidation; and treating the gas with the reconstituted ammonacal liquid in the gas washing stage.

8. The process of removing hydrogen sulphide from gas which also contains ammonia, consisting in: washing the gas with water containing in solution or suspension a metal compound which forms an insoluble sulphide capable of oxidation in aqueous suspension; distilling the resulting aqueous suspension for removal of ammonia; regenerating the metal compound in aqueous suspension after the ammonia has been distilled out by treating the distilled aqueous suspension from the distillation stage with an oxidizing agent; cooling the liquid after oxidation, and returning it to the gas washing stage.

9. A process as claimed in claim 8 in which the metal compound is hydrated ferric oxide.

10. The process of removing hydrogen sulphide from gas which also contains ammonia, consisting in: washing the gas with water containing in solution or suspension a metal compound which forms an insoluble sulphide capable of oxidation in aqueous suspension; distilling the resulting suspension for removal of ammonia; treating and agitating the distilled suspension from the distillation stage with an oxidizing agent; cooling the liquid after oxidation; and returning it to the gas washing stage.

11. The process of removing hydrogen sulphide from gas which also contains ammonia, consisting in: washing the gas with water containing in solution or suspension a metal compound which forms an insoluble sulphide capable of oxidation in aqueous suspension; distilling the resulting suspension for removal of ammonia; treating the distilled suspension from the distillation stage with finely atomized air for oxidation; cooling the liquid after oxidation; and returning it to the gas washing stage.

12. The process of removing hydrogen sulphide from gas which also contains ammonia, consisting in: washing the gas with water containing in solution or suspension a metal compound which forms an insoluble sulphide capable of oxidation in aqueous suspension; distilling the resulting suspension for removal of ammonia; treating the distilled suspension from the distillation stage with an oxidizing agent; cooling the liquid after oxidation, returning the cooled liquid to the gas washing stage, withdrawing part of the liquid from time to time after the oxidation stage and distilling such part for the recovery of any ammonia present as fixed salts.

13. The process for treating coal gas which consists in: removing therefrom substantially all of the tar and fixed ammonia compounds and then bringing the gas into contact with water containing a ferric compound in solution or suspension, distilling the ferric sulphide suspension for removal of ammonia, treating the suspension after distillation with an oxidizing agent, cooling the liquid after oxidation and returning it to the gas washing stage, distilling the liquor condensate containing the fixed ammonia compounds and adding the ammonia therefrom to that derived from the distillation of the ferric sulphide suspension.

14. The process of treating coal gas which consists in: removing the tar and fixed ammonia compounds; then washing the gas with water containing a ferric compound in solution or suspension; distilling the resulting ferric sulphide suspension to remove ammonia and passing the ammonia into the gas after the gas washing stage; distilling the liquor condensate containing the fixed ammonia compound and adding the resulting ammonia also to the gas after the gas washing stage; passing the gas through a heater and saturator for recovery of the ammonia as ammonium sulphate; oxidizing the ferric sulphide suspension from the distillation, and then returning the oxidized suspension to the gas washing stage.

15. The process for removing the hydrogen sulphide from gas which consists in: passing the gas into the bottom of an absorbing tower; introducing an ammoniacal solution part way up the tower; introducing a liquid containing a compound of a metal whose sulphide is insoluble in the upper part of the tower; removing the commingled liquids from the bottom of the tower; removing the ammonia from the removed commingled liquids; oxidizing the thus formed neutral suspension; removing the resulting sulphur; cooling the liquid, and returning it to the upper part of the absorbing tower.

16. A process as claimed in claim 15 in which the rate of flow of liquid in the upper part of the tower is such as to be sufficient to properly wash the ammonia out of the gas so as to prevent any of the ammonia from escaping out of the tower with the gas.

17. The process for removing hydrogen sulphide from gases which consists in: passing the gas into the bottom of an absorbing tower; introducing an ammoniacal solution part way up the tower; introducing a liquid containing a ferric compound in the upper part of the tower; removing the commingled liquids from the bottom of the tower; distilling the removed commingled liquid to separate the ammonia therefrom; condensing the ammoniacal liquor of such distillation; returning such condensed ammoniacal liquor to the tower; oxidizing the thus formed neutral suspension remaining after such ammonia distillation; removing the sulphur formed by such oxidation; cooling the oxidized liquid; and returning it to the upper part of the tower.

18. A process of removing hydrogen sulphide from gas containing it and also containing ammonia, which consists in: washing such gas with a wash liquor containing a compound of a metal whose sulphide is insoluble; recovering the ammonia from the spent sulphided wash liquor; regenerating said metal while in the residue of such ammonia-free wash liquor by aerating the wash liquor after it is freed of such ammonia to liberate the sulphur and actify the metal and reusing the aerated wash liquor containing the regenerated sulphur-free metal for further absorption of hydrogen sulphide.

19. A process of regenerating an ammoniacal wash liquor containing a sulphide metal compound which consists in: distilling the ammonia out of the liquid while it contains the sulphide metal compound; then after ammonia has been distilled out of the liquid aerating the residue of such liquid to oxidize the metal therein and liberate the sulphur therefrom as free sulphur.

20. A process of removing hydrogen sulphide from gas which consists in: absorbing the hydrogen sulphide from the gas by means of an iron compound wash liquor and ammonia; distilling the ammonia out of the resultant liquid; then after ammonia has been distilled out of the liquid aerating the residue of such liquid while containing the iron compound; recovering the ammonia; and returning the aerated liquid for further absorption of hydrogen sulphide.

21. A process of removing hydrogen sulphide from gas which consists in: absorbing the hydrogen sulphide from the gas by means of an iron compound wash liquor and ammonia; distilling the ammonia out of the resultant liquid and then recovering the ammonia; areating the residue of the distilled liquid while containing the iron compound therein to regenerate the iron compound therein with liberation of free sulphur in the liquid; and returning the regenerated iron compound with wash liquor to absorb further hydrogen sulphide from gas.

22. In a process of purifying gas of hydrogen sulphide by means of an ammoniacal solution containing an iron compound whose sulphide is insoluble, the improvement which consists in: distilling the ammonia out of the liquid after it is sulphided by absorption of hydrogen sulphide; and after ammonia has been distilled out of the liquid aerating the resultant ammonia-freed liquid while still containing the iron compound to regenerate the iron compound therein with consequent liberation of free sulphur.

23. A process of purifying ammonia-bearing gas of hydrogen sulphide which consists in: washing the gas with a wash liquor containing iron oxide; distilling the wash liquor, prior to regeneration of iron compound therein to remove the contained ammonia that the wash liquor washed out of the gas; recovering the distilled ammonia as ammonium sulphate; regenerating the iron compound while in the wash liquor after ammonia has been distilled therefrom by aerating the ammonia-freed wash liquor to convert therein the iron sulphide to iron oxide and liberate in the wash liquor as free sulphur the sulphur of the hydrogen sulphide absorbed from the gas; and returning the wash liquor containing the regenerated iron oxide to the gas stream for further use in purification.

24. In a process of removing hydrogen sulphide involving the use of ammonia and a ferric compound wash liquor to absorb the hydrogen sulphide from the gas, the steps consisting in: separating the ammonia from the sulphided ferric compound wash liquor; after ammonia has been separated from the liquor, oxidizing the said ferric compound while in the wash liquor by aerating the ammonia-free sulphided ferric compound wash liquor; and returning the oxidized ferric compound wash liquor for further use in absorbing hydrogen sulphide.

25. Apparatus for treating gas comprising: a hot drain tank; means for leading pitch to said tank; a primary cooler; means for leading condensed tar and fixed ammonia compounds from said primary cooler to said hot drain tank; a tar extractor; means for leading extracted tar to said hot drain tank; an exhauster; an ammonia scrubber; means for leading gas from the exhauster to an ammonia scrubber; a separator for separating tar from fixed ammonia compounds; means for leading the contents of the hot drain tank to the separator; means for receiving tar from the separator; means for receiving fixed ammonia compounds from the separator; an ammonia still comprising a free column, a line column and a fixed column; means for leading fixed ammonia compounds to the still from the receiver for fixed ammonia compounds; an ammonia condenser; means for leading distilled ammonia from the ammonia still to the ammonia condenser; means for supplying wash liquor containing iron oxide to the ammonia scrubber; an ammonia still column; means for leading wash liquor from the ammonia scrubber to said still column; means for leading ammonia from the still column to the ammonia condenser; an aeration tank and means therein for supplying finely atomized air; means for leading residuum hot wash liquor from the still column to said aeration tank; means for receiving sulphur liberated in the aeration tank; means for returning aerated wash liquor to the ammonia scrubber; means for cooling wash liquor while being returned to the ammonia scrubber; and means for leading a portion of liquor in the aeration tank to said ammonia still.

26. Apparatus for treating gas comprising: a hot drain tank; means for leading pitch to said tank; a primary cooler; means for leading condensed tar and fixed ammonia compounds from said primary cooler to said hot drain tank; a tar extractor; means for leading extracted tar to said hot drain tank; an exhauster; an absorber tower; means for leading gas from the exhauster to an absorber tower; means for leading gas from the absorber tower to a gas reheater; means for leading gas from the reheater to an ammonia saturator; a separator for separating tar and fixed ammonia compounds; means for leading the contents of the hot drain tank to said separator; means for receiving tar from the separator; means for receiving fixed ammonia compounds from the separator; an ammonia still comprising a free column, a lime column and a fixed column; means for leading fixed ammonia compounds to said ammonia still; means for leading ammonia from the ammonia still to said ammonia saturator; means for supplying a wash liquor containing iron oxide to the absorber tower; an ammonia still column; means for leading wash liquor from the absorber tower to said ammonia still column; means for leading ammonia from the still column to said ammonia saturator; an aeration tank and means therein for supplying finely atomized air; means for leading residuum hot wash liquor from the still column to said aeration tank; means for receiving sulphur liberated in the aeration tank; means for returning aerated wash liquor to the absorber tower; means for cooling aerated wash liquor while being returned to the absorber tower; and means for leading a portion of liquor in the aeration tank to said ammonia still.

27. Apparatus for treating gas for the removal of hydrogen sulphide, said apparatus including: an absorber tower; an ammonia liquor tank; means for leading liquor from said tank to the lower portion of the tower; means for leading a wash liquor containing iron oxide from an aeration tank to the upper part of said absorber tower; means for leading gas to be purified to the lower portion of said tower; means for leading gas from the upper portion of said tower; a heat exchanger; means for leading commingled liquids from the bottom of the absorber tower to said heat exchanger; a still column; means for leading commingled liquids from the heat exchanger to said still column; means for leading ammonia from the still column to the heat exchanger; means for leading ammonia from the heat exchanger to the ammonia liquor tank; a condenser for condensing distilled ammonia on its way to the ammonia liquor tank; an aeration tank; and means therein for supplying finely atomized air; means for leading residuum hot wash liquor from the still column to said aeration tank; means for receiving sulphur liberated in the aeration tank; means for cooling aerated wash liquor during return to the upper portion of the absorber.

28. Apparatus for treating gas for the removal of hydrogen sulphide, said apparatus including: a structure in which the hydrogen sulphide is to be absorbed from gas by means of ammonia and a liquid containing ferric compound; a still for removing the ammonia from spent liquid from said structure; means for recovering ammonia from said still; an aeration tank for aerating residuum liquid from the still column; means for returning aerated liquid from the aeration tank to said structure.

29. A process for removing hydrogen sulphide from gas which consists in: washing the gas with an ammoniacal solution containing a compound of a metal which forms an insoluble sulphide capable of oxidation in aqueous suspension; treating the resulting metal sulphide aqueous suspension to render it free of ammonia alkalinity; then treating the aqueous suspension with an oxidizing agent after it has been treated to render it free of ammonia alkalinity; taking ammonia into the liquid after oxidation; and treating gas with the reconstituted ammoniacal liquid in the gas washing stage.

30. A process for removing hydrogen sulphide from gas which consists in; washing the gas with a solution of free ammonia containing a compound of a metal which forms an insoluble sulphide capable of oxidation in aqueous suspension; treating the resulting metal sulphide aqueous suspension to render it free of free ammonia; then treating the aqueous suspension with an oxidizing agent after it has been treated to render it free of free ammonia; taking ammonia into the liquid after oxidation; and treating gas with the reconstituted ammoniacal liquid in the gas washing stage.

31. A process for removing hydrogen sulphide from gas which consists in: washing the gas with an ammoniacal solution containing a compound of a metal which forms an insoluble sulphide capable of oxidation in aqueous suspension; removing substantially all of the ammonia alkalinity from the resulting metal sulphide aqueous suspension; then treating the aqueous suspension with an oxidizing agent after removal of ammonia alkalinity; taking ammonia into the liquid after oxidation; and treating gas with the reconstituted ammoniacal liquid in the gas washing stage.

32. A process of regenerating an ammoniacal wash liquor containing a sulphide-metal compound which consists in: removing the ammonia alkalinity from the liquid; then aerating the liquid after removal of ammonia alkalinity to oxidize the metal and liberate sulphur therefrom as free sulphur.

33. A process of regenerating an ammoniacal wash liquor containing a sulphide-metal compound which consists in: treating the liquid to free it of ammonia alkalinity; then after said treatment aerating the liquid to oxidize the metal and liberate sulphur therefrom as free sulphur.

34. A process of regenerating a wash liquor containing free ammonia and a sulphide-metal compound which consists in: treating the liquid to free it of free ammonia; then after said treatment aerating the liquid to oxidize the metal and liberate sulphur therefrom as free sulphur.

35. A process of removing hydrogen sulphide from gas containing it and also containing ammonia, which consists in: washing such gas with a wash liquor containing a compound of a metal whose sulphide is insoluble; treating the spent sulphided wash liquor to render it free of ammonia alkalinity; then after said treatment regenerating the wash liquor to liberate the sulphur and actify the metal; and re-using the regenerated wash liquor containing the regenerated sulphur-free metal for further absorption of hydrogen sulphide.

36. A process as claimed in claim 35 in which the regeneration of the wash liquor is effected by aeration.

In testimony whereof, I have hereunto set my hand.

FREDERICK W. SPERR, Jr.